US011347412B2

(12) United States Patent
Tadokoro (10) Patent No.: US 11,347,412 B2
(45) Date of Patent: May 31, 2022

(54) MEMORY SYSTEM AND METHOD OF CONTROLLING NONVOLATILE MEMORY

(71) Applicant: Kioxia Corporation, Minato-ku (JP)

(72) Inventor: Mitsunori Tadokoro, Tokyo (JP)

(73) Assignee: Kioxia Corporation, Minato-ku (JP)

( * ) Notice: Subject to any disclaimer, the term of this patent is extended or adjusted under 35 U.S.C. 154(b) by 0 days.

(21) Appl. No.: 17/009,068

(22) Filed: Sep. 1, 2020

(65) Prior Publication Data

US 2021/0294506 A1 Sep. 23, 2021

(30) Foreign Application Priority Data

Mar. 17, 2020 (JP) .............................. JP2020-046711

(51) Int. Cl.
*G06F 3/06* (2006.01)

(52) U.S. Cl.
CPC .......... *G06F 3/0631* (2013.01); *G06F 3/0604* (2013.01); *G06F 3/0653* (2013.01); *G06F 3/0659* (2013.01); *G06F 3/0665* (2013.01); *G06F 3/0673* (2013.01)

(58) Field of Classification Search
CPC .... G06F 3/0631; G06F 3/0604; G06F 3/0659; G06F 3/0673; G06F 3/0653; G06F 3/0665
See application file for complete search history.

(56) References Cited

U.S. PATENT DOCUMENTS

| | | | |
|---|---|---|---|
| 2017/0123976 A1 | 5/2017 | Motwani | |
| 2017/0139610 A1 | 5/2017 | Choi et al. | |
| 2017/0351431 A1* | 12/2017 | Dewitt | G06F 3/0631 |
| 2020/0004445 A1* | 1/2020 | Benisty | G06F 3/061 |
| 2020/0104056 A1* | 4/2020 | Benisty | G06F 12/0246 |
| 2020/0409576 A1* | 12/2020 | Bahirji | G06F 3/0659 |
| 2021/0255778 A1* | 8/2021 | Garewal | G06F 9/45558 |

* cited by examiner

*Primary Examiner* — Sean D Rossiter
(74) *Attorney, Agent, or Firm* — Oblon, McClelland, Maier & Neustadt, L.L.P.

(57) ABSTRACT

According to one embodiment, a memory system allocates one or more areas of a plurality of areas obtained by equally dividing a first logical address space of the memory system to each of a plurality of namespaces. Each of the areas has such a size that areas corresponding in number to a maximum number of namespaces to be supported are allocable to a remaining space excluding a size equivalent to that of an advertised capacity form the first logical address space. When a size of a first namespace is to be expanded, the memory system updates the first management table and additionally allocates an unused area to the first namespace.

10 Claims, 10 Drawing Sheets

F I G. 10

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2020-046711, filed Mar. 17, 2020, the entire contents of which are incorporated herein by reference.

FIELD

Embodiments described herein relate generally to a memory system and a method of controlling a nonvolatile memory.

BACKGROUND

Recently, storage devices which control nonvolatile memories are widely used.

As such storage devices, a solid state drive (SSD) including a NAND flash memory is known. The SSD is used in various computers.

In the SSD, there is a demand of implementing a technique for efficiently managing each namespace used by a host to access the SSD.

DETAILED DESCRIPTION

Various embodiments will be described hereinafter with reference to the accompanying drawings.

In general, according to one embodiment, a memory system is connectable to a host. The memory system comprises a nonvolatile memory and a controller configured to control the nonvolatile memory. The controller allocates one or more areas of a plurality of areas to each of a plurality of namespaces used by the host to access the memory system. The plurality of areas are obtained by equally dividing a first logical address space of the memory system managed by the controller. Each of the plurality of areas has such a size that areas corresponding in number to a maximum number of namespaces to be supported are allocable to a remaining space excluding a second logical address space from the first logical address space. The second logical address space has a size equivalent to a size of an advertised capacity of the memory system. The controller manages a corresponding relation between each of the plurality of namespaces and the one or more areas allocated to each of the plurality of namespaces, using a first management table. The controller updates, when a size of a first namespace of the plurality of namespaces is to be expanded, the first management table and additionally allocates an unused area of the plurality of areas to the first namespace.

Figure 1:
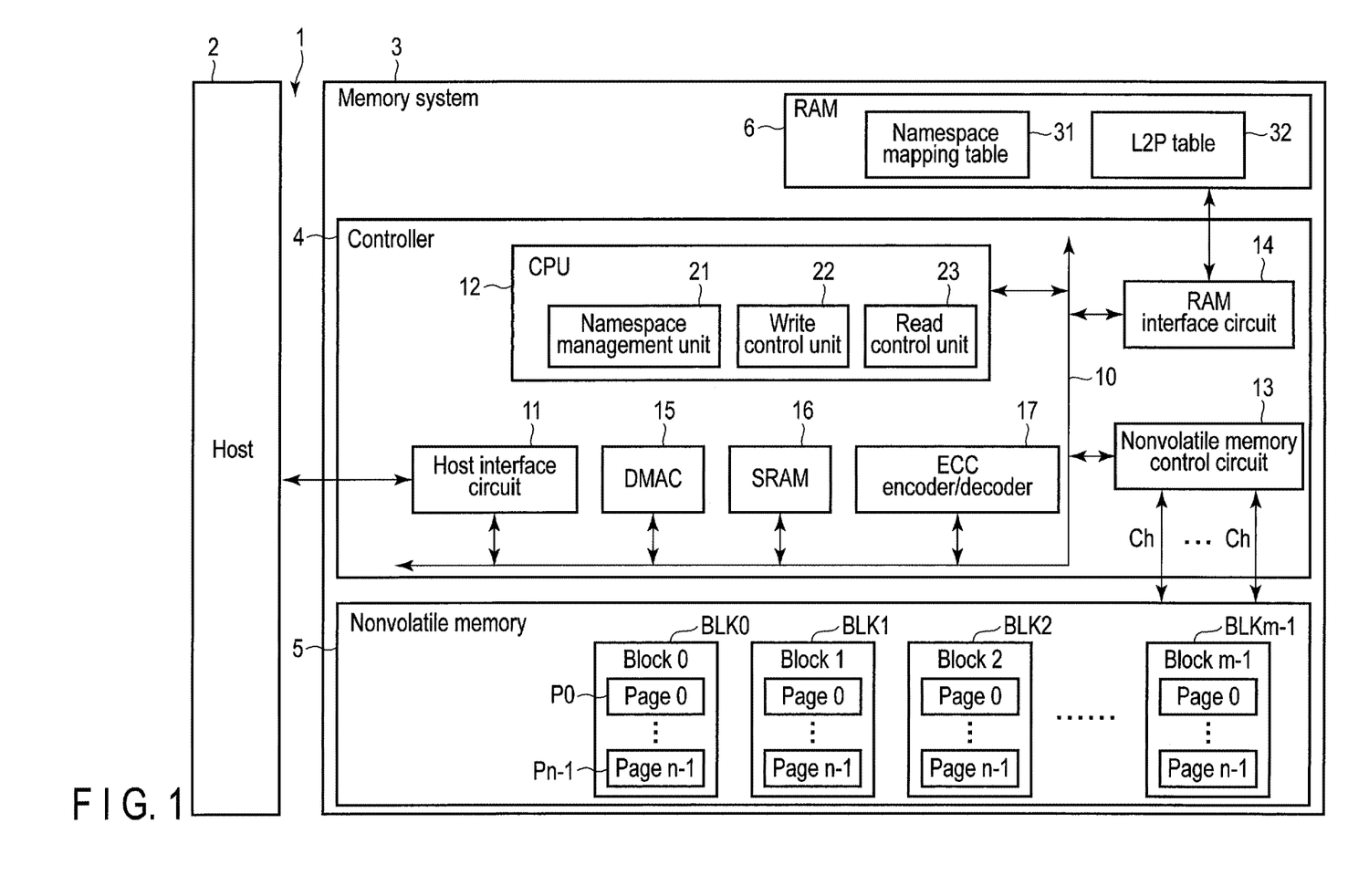
FIG. 1 is a block diagram illustrating a configuration example of a storage system including a memory system according to an embodiment.

First, a configuration of a memory system according to an embodiment will be described. FIG. 1 is a block diagram illustrating a configuration example of a storage system 1 including a memory system 3 according to the embodiment. The storage system 1 includes a host (host device) 2 and the memory system 3.

The host 2 is an information processing apparatus which controls operation of the memory system 3. Examples of the information processing apparatus include personal computers, server computers, mobile terminals and vehicle-mounted devices. The host 2 transmits, to the memory system 3, a write request which is a request to write data into the memory system 3. The host 2 also transmits, to the memory system 3, a read request which is a request to read data from the memory system 3.

The memory system 3 is a semiconductor storage device configured to write data into a nonvolatile memory. The memory system 3 is also a semiconductor storage device configured to read data from a nonvolatile memory. The memory system 3 is implemented as, for example, a solid state drive (SSD) including a NAND flash memory. The memory system 3 is connectable to the host 2. The memory system 3 is built in, for example, the information processing apparatus. The memory system 3 may be connected to the information processing apparatus via a cable or a network.

The memory system 3 includes a controller 4, a nonvolatile memory 5 and a random-access memory (RAM) 6.

The controller 4 is a memory controller configured to control the nonvolatile memory 5. The controller 4 may be implemented by a controller circuit such as a System-on-a- chip (SoC). The controller 4 is communicatively coupled with the nonvolatile memory 5. Also, the controller 4 is electrically connected to the nonvolatile memory 5.

The nonvolatile memory 5 is, for example, a NAND flash memory. The nonvolatile memory 5 may be implemented as a NAND flash memory having a two-dimensional structure or a NAND flash memory having a three-dimensional structure.

A memory cell array of the NAND flash memory 5 includes a plurality of blocks BLK0 to BLKm-1. The blocks BLK0 to BLKm-1 each function as a unit for an erase operation. Each of the blocks BLK0 to BLKm-1 includes a plurality of pages (here, pages P0 to Pn-1). Each of the pages includes a plurality of memory cells connected to the same word line. The pages P0 to Pn-1 are units of a data write operation and a data read operation.

The RAM 6 is a volatile semiconductor memory. When supply of power to the RAM 6 is stopped, the data stored in the RAM 6 is lost. The RAM 6 is, for example, a dynamic RAM (DRAM). A part of the memory area of the RAM 6 may be used as a write buffer. The write buffer is a memory area for temporarily storing data to be written into the nonvolatile memory 5. The data to be written into the nonvolatile memory 5 is, for example, data associated with a write request received from the host 2.

Next, a detailed configuration of the controller 4 will be described. The controller 4 includes a host interface circuit 11, a CPU 12, a nonvolatile memory control circuit 13, a RAM interface circuit 14, a direct memory access controller (DMAC) 15, a static RAM (SRAM) 16, and an ECC encoder/decoder 17. The host interface circuit 11, the CPU 12, the nonvolatile memory control circuit 13, the RAM interface circuit 14, the DMAC 15, the SRAM 16 and the ECC encoder/decoder 17 are connected to a bus 10.

The host interface circuit 11 is configured to execute communications with the host 2. The host interface 11 receives various requests from the host 2. The various requests include a write request and a read request.

The CPU 12 is a processor configured to control the host interface circuit 11, the nonvolatile memory control circuit 13, the RAM interface circuit 14, the DMAC 15, the SRAM 16 and the ECC encoder/decoder 17. The CPU 12 carries out various processes by executing a control program (firmware). The CPU 12, in response to supply of power to the memory system 3, loads the control program (firmware) into the SRAM 16 or RAM 6 from a ROM (not shown) or the nonvolatile memory 5. The CPU 12 can function as a flash translation layer (FTL) configured to execute the management of data stored in the nonvolatile memory 5 and the management of blocks included in the nonvolatile memory 5. The data management executed by the FTL includes management of mapping information indicating the corresponding relation between each of logical addresses and each of physical addresses.

The logical address is an address indicating a location in a logical address space of the memory system 3. A physical address corresponding to a logical address indicates a physical storage location in the NAND flash memory 5, in which data corresponding to the logical address is written. Generally, for the logical address, a logical block address (LBA) can be used. The CPU 12 manages the corresponding relation between each of the logical address and each of the physical address using the logical-to-physical address translation table (L2P table) 32.

The nonvolatile memory control circuit 13 is a memory control circuit configured to control the nonvolatile memory 5 under the control of the CPU 12. The nonvolatile memory control circuit 13 is configured to control a plurality of nonvolatile memory chips. The nonvolatile memory control circuit 13 may be connected to the nonvolatile memory chips via a plurality of channels (Ch), for example.

The RAM interface circuit 14 is a RAM control circuit configured to control the RAM 6 under the control of the CPU 12. The RAM interface circuit 14 is, for example, a DRAM control circuit configured to control a DRAM. A part of the memory area of the RAM 6 may be used to store the namespace mapping table 31 and the L2P table 32. The namespace mapping table 31 is a management table for managing a corresponding relation between each of namespaces and one or more areas in the logical address space which are allocated to each of the namespaces. The L2P table 32 is a management table for managing the corresponding relation between each of the logical address and each of the physical address in units of a predetermined management size.

The DMAC 15 executes data transfer between a memory of the host 2 and the SRAM 16 (or the RAM 6) under the control of the CPU 12.

The SRAM 16 is a volatile semiconductor memory. When supply of power to the SRAM 16 is stopped, the data stored in the SRAM 16 is lost. A part of the memory area of the SRAM 16 may be used as a write buffer for temporarily storing data to be written into the nonvolatile memory 5.

The ECC encoder/decoder 17 adds an error correction code (ECC) to user data as a redundant code by encoding (ECC-encoding) the user data, before writing the user data in the nonvolatile memory 5. When user data is read from the NAND flash memory 5, the ECC encoding/decoding unit 17 executes error correction of the read user data (ECC decoding) by using the ECC added to the read user data.

Next, a namespace management of the embodiment will be described. The CPU 12 can function as a namespace management unit 21, a write control unit 22 and a read control unit 23. Some or all of the namespace management unit 21, the write control unit 22 and the read control unit 23 may be implemented by hardware in the controller 4.

The namespace management unit 21 manages a plurality of namespaces. The namespaces are logical address ranges which are independent from each other. The namespaces are used to operate one storage device as if it is a plurality of storage devices. The namespaces are used by the host 2 to access the memory system 3.

The namespace management unit 21 manages each of a plurality of areas obtained by equally dividing a logical address space of the memory system 3 as a namespace access unit. The namespace management unit 21 allocates one or more areas (one or more namespace access units) in the logical address space to each of the namespaces. Each namespace access unit includes consecutive logical addresses. Each namespace access unit is referred to also as a logical address range.

The namespace management unit 21 is configured to execute a namespace resizing process. The namespace resizing process is a process to dynamically change the size of any namespace.

The write control unit 22 receives, from the host 2, a write request including a parameter specifying a namespace identifier (NSID) to identify a namespace and a parameter specifying an LBA (write destination LBA) within the namespace. The write control unit 22 writes data associated with a received write request into the nonvolatile memory 5 via the nonvolatile memory control circuit 13.

The read control unit 23 receives, from the host 2, a read request including a parameter specifying a namespace identifier (NSID) to identify a namespace and a parameter specifying LBA (read target LBA) within the namespace. The read control unit 23 reads read target data corresponding to a read target LBA from the nonvolatile memory 5 via the nonvolatile memory control circuit 13.

Figure 2:
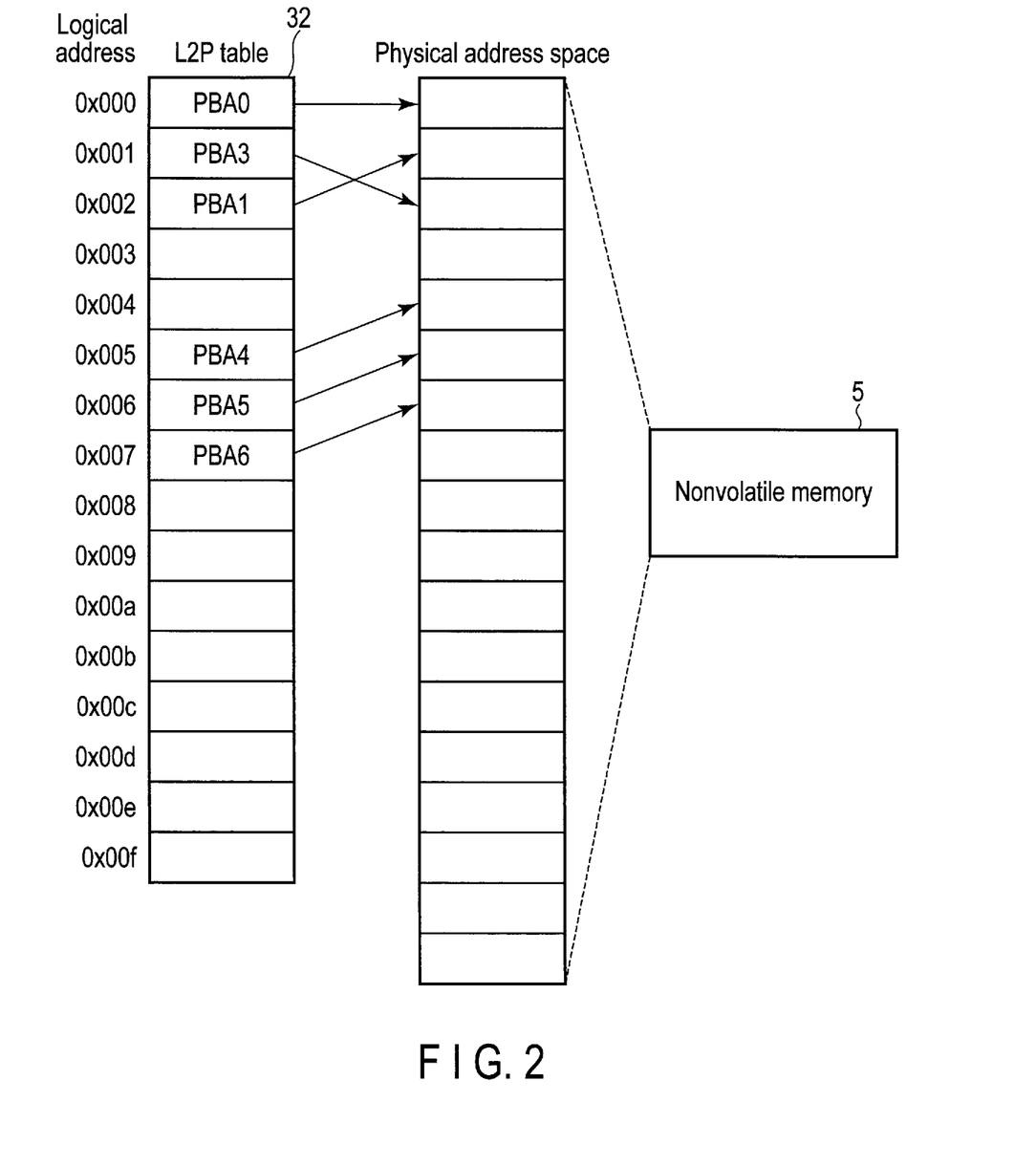
FIG. 2 is a diagram illustrating a configuration example of a logical-to-physical address translation table (L2P table) used in the memory system of the embodiment.

Next, the L2P table 32 of the embodiment will be described. FIG. 2 is a diagram illustrating a configuration example of the L2P table 32 used in the memory system 3. The L2P table 32 is used to manage the corresponding relation between each logical address in a logical address space of the memory system 3 and each physical address in a physical address space of the nonvolatile memory 5 in units of a predetermined management size. The logical address space of the memory system 3 is an address space usable by the host 2 to access the memory system 3. The physical address space of the nonvolatile memory 5 is a set of physical addresses indicative of physical storage locations in the nonvolatile memory 5.

The L2P table 32 includes a plurality of entries corresponding to the logical addresses, respectively. In an entry corresponding to a certain logical address, a physical address associated with the logical address is stored. For example, when the controller 4 writes data corresponding to a logical address into a physical storage location in the nonvolatile memory 5, the controller 4 updates the L2P table 32 to associate a physical address PBA indicating the physical storage location with the logical address.

FIG. 2 illustrates an example case where physical addresses PBA0, PBA3, PBA1, PBA4, PBA5 and PBA6 are associated with logical addresses 0x000, 0x001, 0x002, 0x005, 0x006 and 0x007, respectively.

Figure 3:
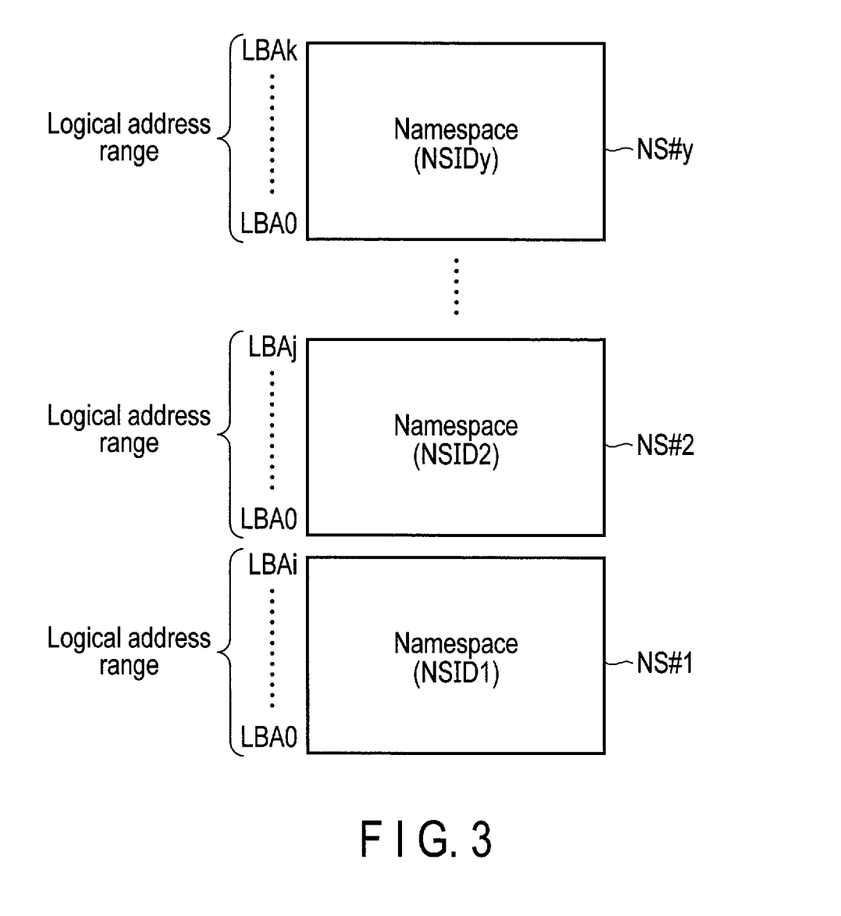
FIG. 3 is a diagram for illustrating a plurality of namespaces to be managed in the memory system of the embodiment.

Next, the namespaces of the embodiment will be described. FIG. 3 is a diagram illustrating a plurality of namespaces managed in the memory system 3.

FIG. 3 illustrates an example case where namespace NS #1, namespace NS #2, namespace NS #y are managed by the controller 4 of the memory system 3. Each namespace is identified by a namespace identifier (NSID). Each namespace includes a set of consecutive logical addresses (LBAs). A logical address range corresponding to each namespace starts from LBA0. Each namespace can be set to any size. The size of each namespace corresponds to the number of LBAs included in each respective namespace. FIG. 3 illustrates an example case where the namespace NS #1 includes consecutive LBAs from LBA0 to LBAi, the namespace NS #2 includes consecutive LBAs from LBA0 to LBAj, and the namespace NS #y includes consecutive LBAs from LBA0 to LBAk.

Next, a namespace creating operation executed by the controller 4 will be described.

The host 2 can transmit a namespace creation request (namespace creation command) to the memory system 3. The namespace creation request can specify the size of the namespace to be created.

In response to receiving from the host 2 a namespace creation request, the controller 4, first, creates a namespace having a size specified by the received namespace creation request. Then, the controller 4 issues a namespace identifier to identify the created namespace, and transmits the issued namespace identifier to the host 2.

Thus, each time a namespace creation request is received from the host 2, the controller 4 creates a namespace. Thereby, a plurality of namespaces can be created in the memory system 3. The thus created namespaces are managed by the controller 4.

Next, a namespace resizing process to change a size of a namespace will be described.

First, a namespace resize process of a comparative example will be described. An SSD according to the comparative example manages an offset and a size (here, 100) for each of the namespaces, using the namespace mapping table. The offset of a namespace indicates a start position (base address) in the logical address space where the LBA range of the namespace is allocated.

Figure 4A:
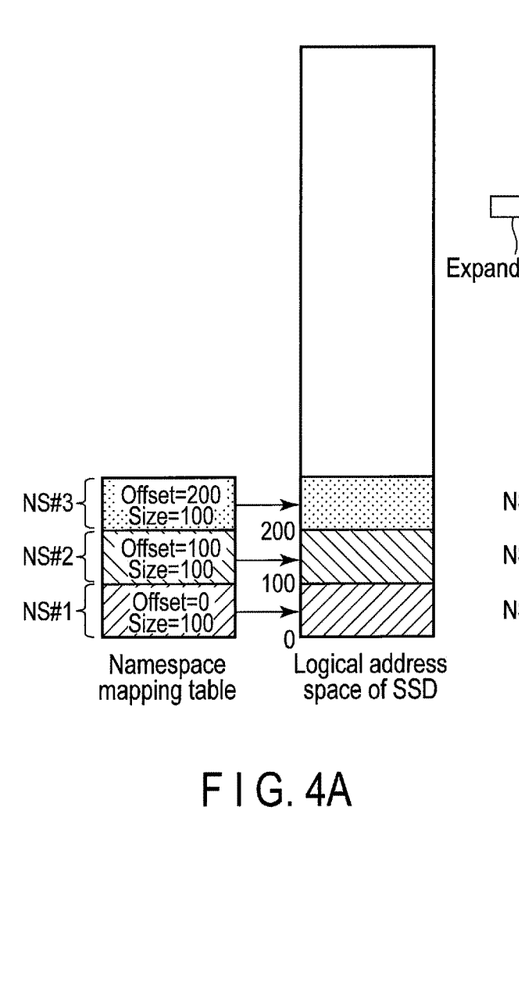
FIG. 4A is a diagram illustrating a state where a plurality of continuous logical addresses are allocated to a plurality of respective namespaces used in a memory system of a comparative example.
Figures 4B, 4C:
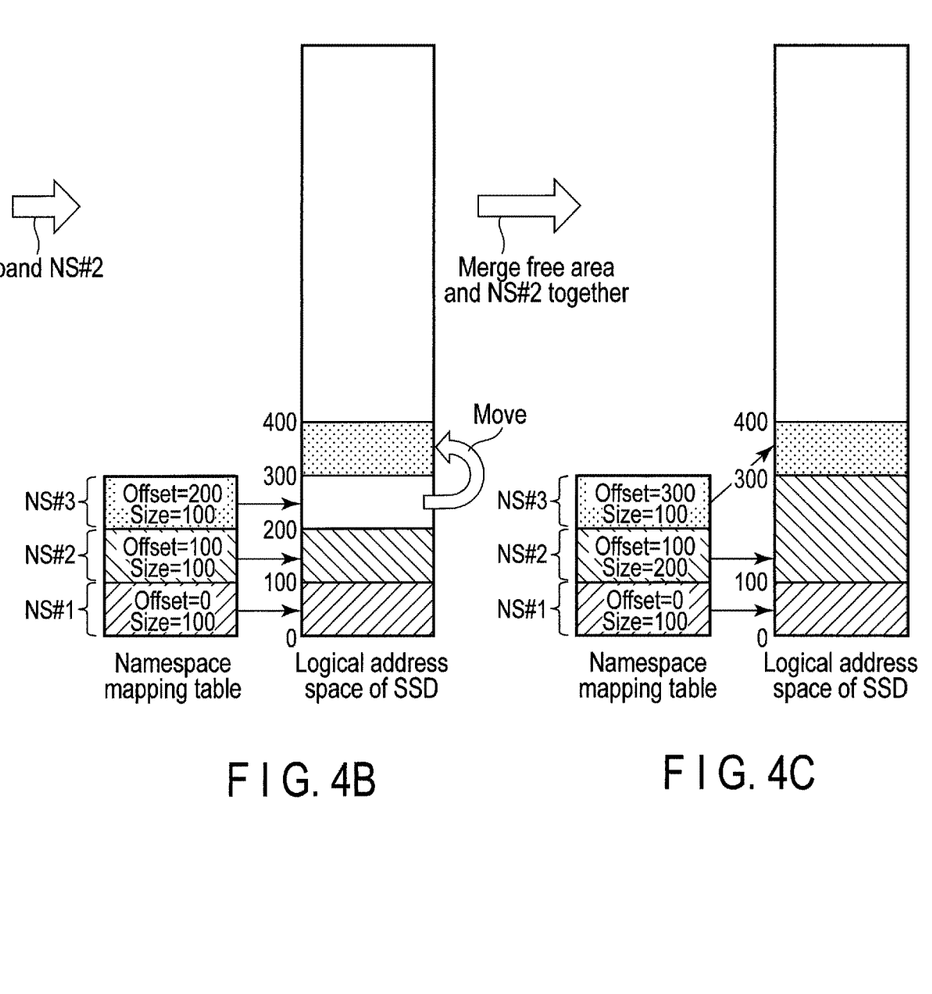
FIG. 4B is a diagram illustrating a state where data of one namespace subsequent to a resize target namespace are moved in the memory system of the comparative example.
FIG. 4C is a diagram illustrating a state where a logical address range corresponding to the resize target namespace is expanded.

FIG. 4A is a diagram illustrating a state where consecutive logic addresses (consecutive LBAs) are allocated to each of a plurality of namespaces. FIG. 4B is a diagram illustrating a state where data of one namespace subsequent to the resize target namespace are moved. FIG. 4C is a diagram illustrating a state where the logical address range corresponding to the resize target namespace is expanded.

As illustrated in FIG. 4A, in the SSD according to the comparative example, for example, the namespace NS #1, namespace NS #2 and namespace NS #3 are managed. In the SSD of the comparative example, consecutive LBAs in the logical address space of the SSD are allocated to each namespace. For example, the LBA range (LBA0 to LBA99) in the logical address space of the SSD is allocated to the namespace NS #1. To the namespace NS #2, the LBA range (LBA100 to LBA199) in the logical address space is allocated. To the namespace NS #3, the LBA range (LBA200 to LBA299) in the logical address space is allocated.

In the SSD of the comparative example, consecutive LBAs in the logical address space need to be allocated to each of the namespaces. Therefore, in order to expand the size of the namespace NS #2, it is necessary to allocate a free LBA range immediately after the LBA range (LBA100 to LBA199) has been allocated to the namespace NS #2 to be resized. A free LBA range is an LBA range which has not been allocated to any namespace.

On the other hand, as illustrated in FIG. 4A, the LBA range (LBA200 to LBA299) immediately after the LBA range (LBA100 to LBA199) of the namespace NS #2 to be resized has already been allocated to the namespace NS #3. Therefore, in order to expand the size of the namespace NS #2 of FIG. 4A, it is necessary to move the data of the namespace NS #3 from the LBA range (LBA200 to LBA299) to another LBA range.

For example, as illustrated in FIG. 4B, the data of the namespace NS #3 are moved from the LBA range (LBA200 to LBA299) to an LBA range (LBA300 to LBA399). By moving the data of the namespace NS #3 to the LBA range (LBA300 to LBA399), the LBA range (LBA200 to LBA299) can be made into a free LBA range.

In the process of moving the data of the namespace NS #3, a processing is executed, which updates the L2P table to associate each physical address where the data of the namespace NS #3 is stored, with the LBA range (LBA300 to LBA399) immediately after the namespace NS #3. Generally, the size of address translation information stored in the L2P table is about 1/1000 of the capacity of the SSD. For example, in an SSD having a capacity of 1T bytes, the size of address translation information stored in the L2P table is 1G bytes. In the case where sixteen namespaces are created in an SSD having a capacity of 1T bytes, the average size of the address translation information necessary per one namespace is about 62M bytes (=1 GB/16). Therefore, when moving the data of one namespace, it is necessary to rewrite several tens of megabytes of address translation information. In such rewriting process of the L2P table, a certain amount of time is required for merely copying the address translation information.

Or in the case where both of data and the logical address corresponding to the data are stored in the nonvolatile memory 5, it is necessary to not only update the L2P table, but also to actually move the data of the namespace NS #3 as well.

After the completion of the process of moving the data of the namespace NS #3, as illustrated in FIG. 4C, the namespace mapping table is updated to so that the size of namespace NS #2 is changed from 100 to 200. Further, the namespace mapping table is updated so that the offset of the namespace NS #3 is changed from 200 to 300. As a result, the namespace NS #2 is merged with the LBA range (LBA200 to LBA299), which is an LBA range (a free area) immediately thereafter, thus enabling to utilize the free area for the namespace NS #2.

Next, a namespace resizing processing according to the embodiment will be described.

Before the description of the namespace resizing process of the embodiment, first, a plurality of areas used in the embodiment and the namespace mapping table 31 of the embodiment will be described.

In the memory system 3, a logical address space (a first logical address space) of the memory system 3 which is managed by the controller 4 is equally divided into a plurality of areas, i.e., a plurality of namespace access units (NSAUs). The namespace access units (NSAUs) are each used as a unit for allocating an LBA range to a namespace. One NSAU includes consecutive LBAs. The size of one NSAU is set to such a size that NSAUs corresponding in number to the maximum number of namespaces to be supported by the memory system 3 can be allocated to a remaining space of the first logical address space. The remaining space is a space excluding a logical address space (a second logical address space) from the first logical address space. The second logical address space has a size equivalent to a size of an advertised capacity (user capacity) of the memory system 3. Thus, the first logical address space is divided in a plurality of NSAUs such that NSAUs corresponding in number to the maximum number of the namespaces to be supported can be allocated to the remaining space of the first logical address space.

Figure 5:
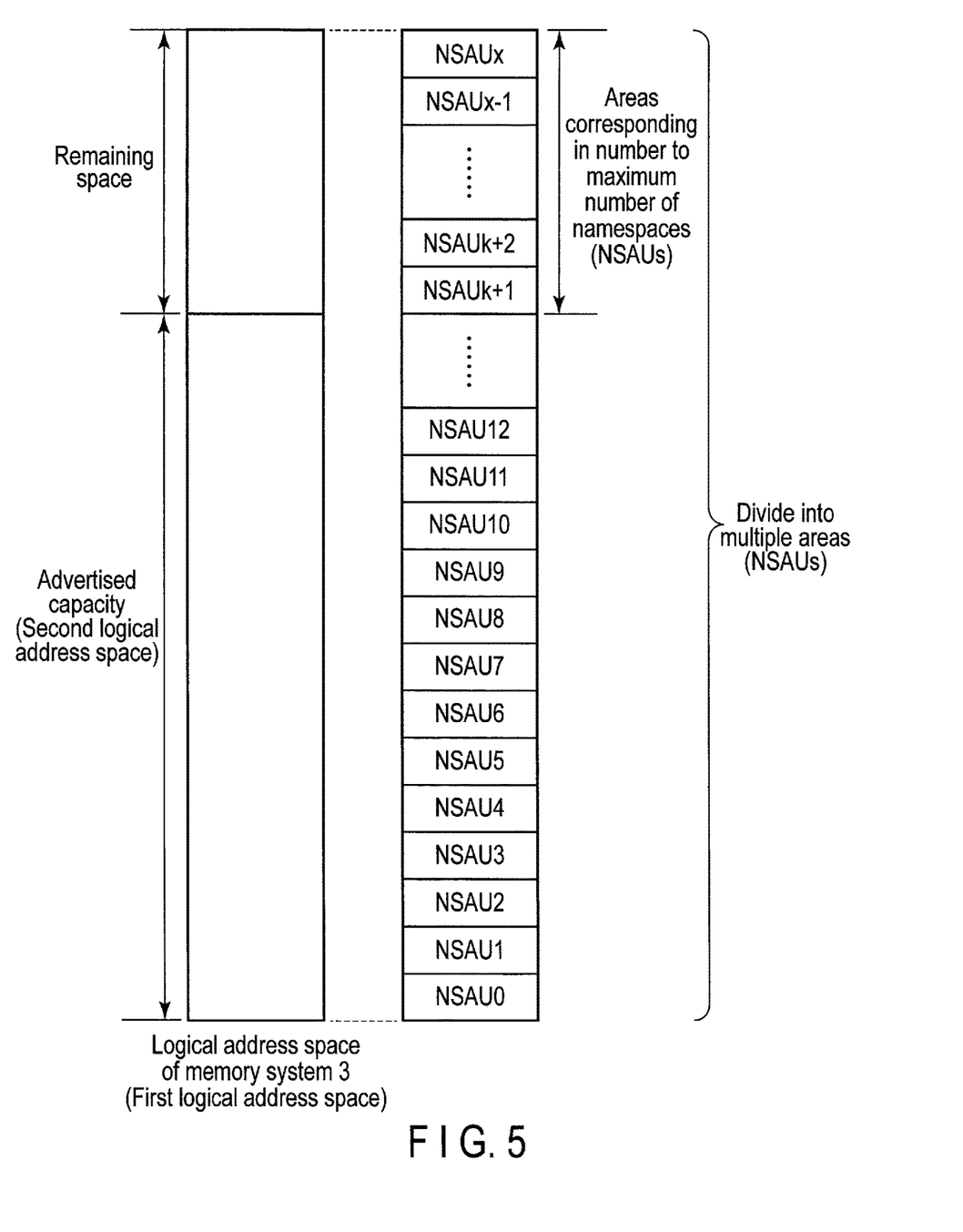
FIG. 5 is a diagram illustrating an example of a plurality of areas (namespace access units) managed in the memory system according to the embodiment.

FIG. 5 illustrates an example of a plurality of areas (namespace access units) managed in the memory system 3. In FIG. 5, the entire first logical address space is divided in a plurality of NSAUs of the same size. In FIG. 5, a case where the entire first logical address space is divided into x+1 (number of) NSAUs (NSAU0 to NSAU12, . . . , NSAUk+1, NSAUk+2, . . . , NSAUx-1, NSAUx) is shown as an example.

In this case, the size of each of the x+1 NSAUs is set to such a size that NSAUs corresponding in number to the maximum number of namespaces to be support by the memory system 3 can be allocated to the remaining space excluding the second logical address space from the first address space. The second logical address space has a size equivalent to that of the advertised capacity. In FIG. 5, the total number of NSAUk+1 to NSAUx corresponds to the maximum number of namespaces to be supported. Generally, a logical address space having a size equivalent to a size of the advertised capacity of the storage device is about 93.14% of the size of the actual logical address space in the storage device managed by binary numbers. This is also similar in the IDEMA standard. In the memory system 3 as well, the controller 4 also manages the first logical address space by the binary numbers. On the other hand, the advertised capacity of the memory system 3 is expressed by the decimal numbers. For example, when the advertised capacity of the memory system 3 is 1 TB (=1,000,000,000 bytes=$10^{12}$ bytes), the size (capacity) of the first logical address space managed by binary numbers may be 1,099,511,627,776 bytes (=$2^{40}$ bytes).

Further, when the maximum number of namespaces to be supported is N, the size of each NSAU may be set to such a size that at least N-1 (number of) NSAUs can be allocated to the remaining space. Thus, the first logical address space is divided in a plurality of NSAUs such that at least N-1 NSAUs can be allocated to the remaining space in the first logical address space.

The number of divisions of the first logical address space vary according to the maximum number of namespaces to be supported. For example, when the maximum number of namespaces to be supported is sixteen, the first logical address space may be divided into, for example, 256 NSAUs. When the second logical address space having a size equivalent to that of the advertised capacity is approximately 93.14% of the first logical address spaces, the second logical address space having a size equivalent to that of the advertised capacity can be expressed by 239 NSAUs of the 256 NSAUs. Thus, even if 239 NSAUs are used for one namespace having a size slightly less than the advertised capacity, there are still seventeen NSAUs remaining. Therefore, one NSAU can be allocated to each of the other fifteen namespaces. When the maximum number of namespaces to be supported is thirty two, the first logical address space may be divided into, for example, 512 NSAUs.

Figure 6:
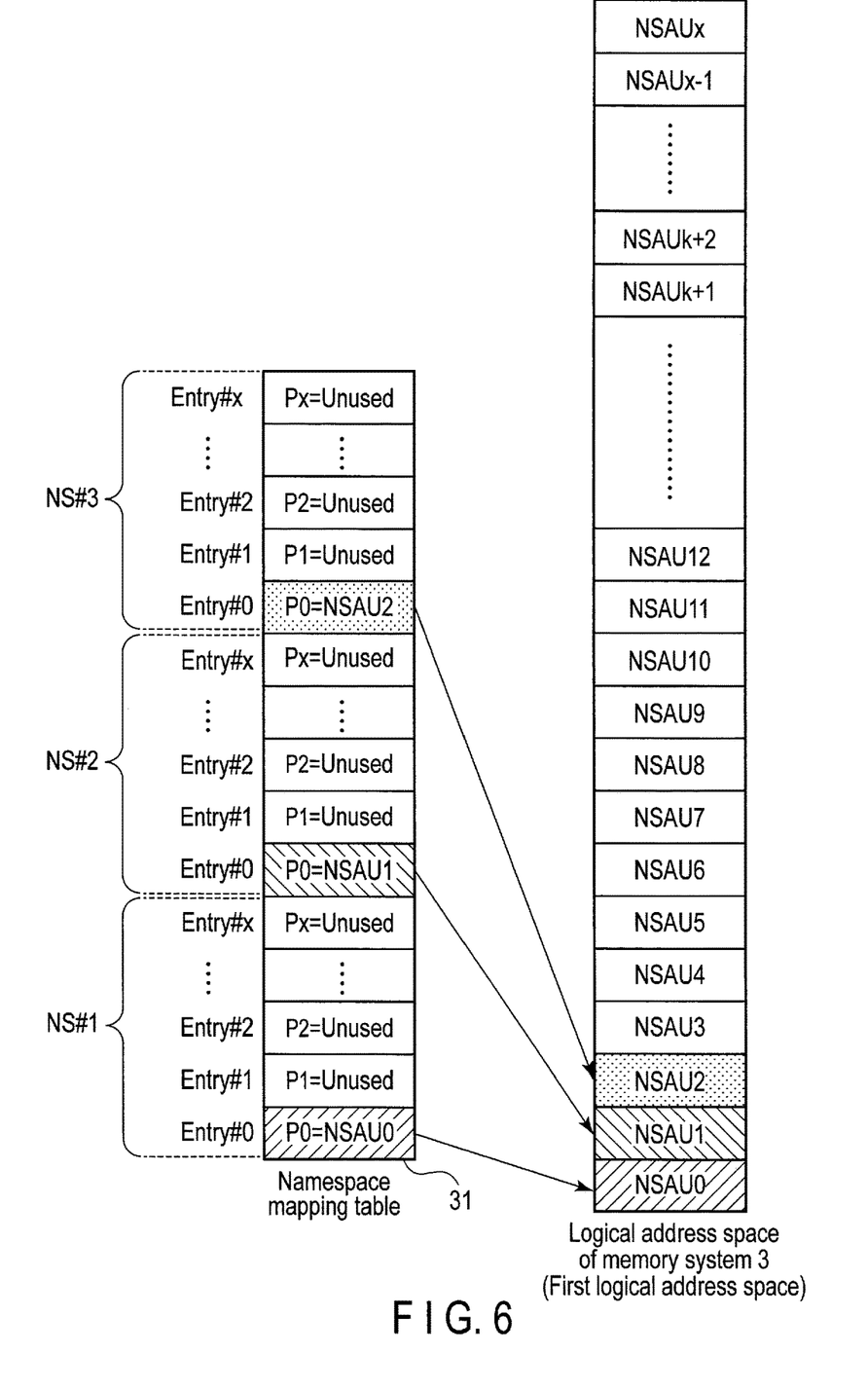
FIG. 6 is a diagram illustrating a configuration example of a namespace mapping table used in the memory system according to the embodiment.

FIG. 6 is a diagram illustrating a configuration example of the namespace mapping table 31 used in the memory system 3 of the embodiment.

The namespace mapping table 31 includes a plurality of table portions respectively corresponding to the namespaces. Each table portion includes entry #0, entry #1, . . . , entry #x. For example, in the case where the first logical address space is divided into 256 NSAUs, each table portion may include 256 entries. One entry stores a pointer indicating the location of one NSAU in the first logical address space.

For example, when the size of the namespace NS #1 is less than or equal to the size of one NSAU and the NSAU0 is allocated to the namespace NS #1, a pointer P0 of the entry #0 of the table portion corresponding to the namespace NS #1 is set to a value indicating the NSAU0. Each of the pointers P1 to Px of the entries #1 to #x of the table portion corresponding to the namespace NS #1 is not used and is set to a particular value indicating a non-use state.

When the size of the namespace NS #2 is less than or equal to the size of one NSAU and the NSAU1 is allocated to the namespace NS #2, the pointer P0 of the entry #0 of the table portion corresponding to namespace NS #2 is set to a value indicating the NSAU1. Each of the pointers P1 to Px of the entries #1 to #x of the table portion corresponding to the namespace NS #2 is not used and is set to a particular value indicating the non-use state.

Similarly, when the size of the namespace NS #3 is less than or equal to the size of one NSAU and the NSAU2 is allocated to the namespace NS #3, the pointer P0 of the entry #0 of the table portion corresponding to namespace NS #3 is set to a value indicating the NSAU2. Each of the pointers P1 to Px of the entries #1 to #x of the table portion corresponding to the namespace NS #3 is not used and is set to a particular value indicating the non-use state.

Figures 7A, 7B, 7C:
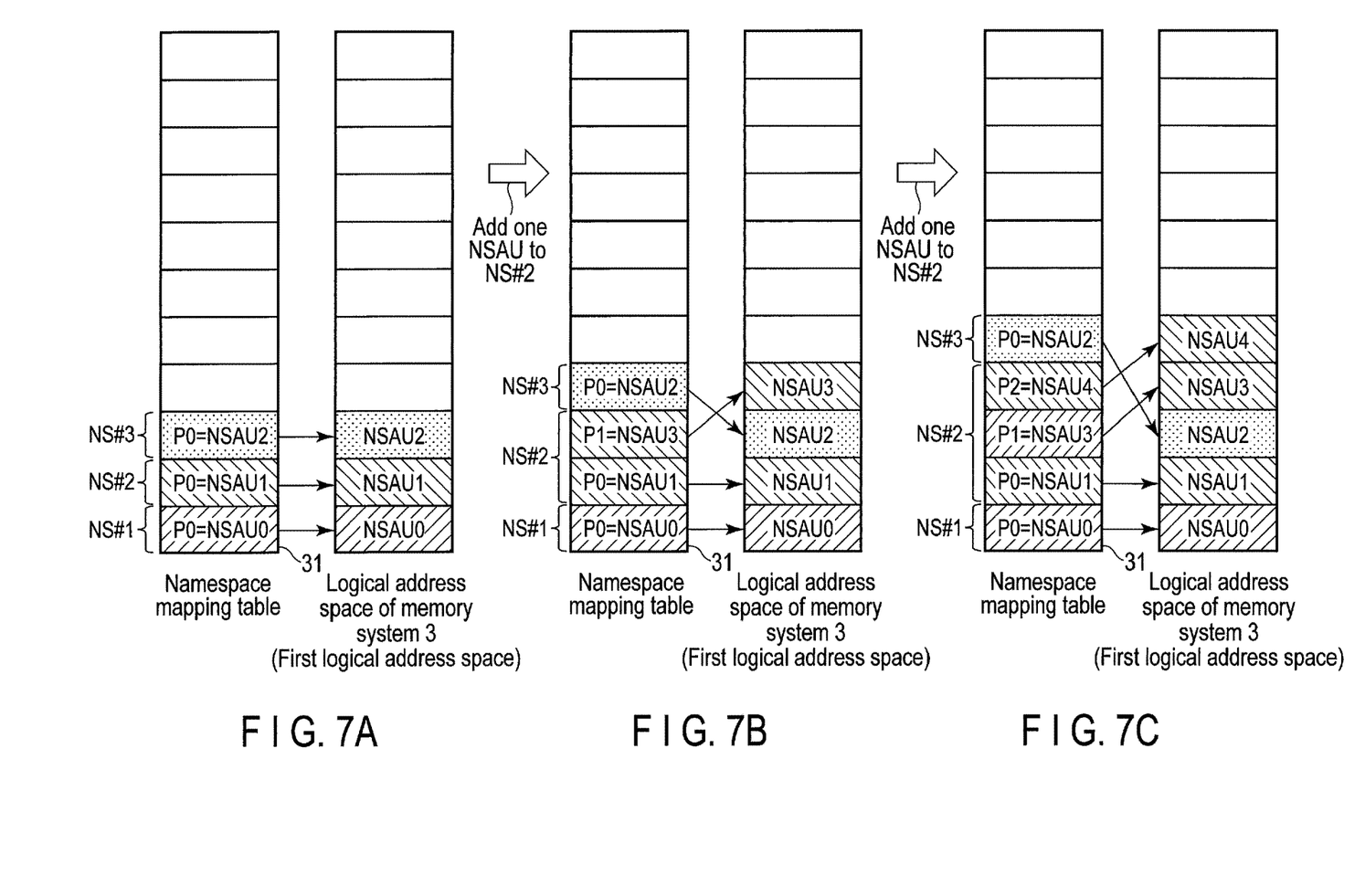
FIG. 7A is a diagram illustrating a state where one area in a logical address space is allocated to each of the plurality of namespaces used in the memory system according to the embodiment.
FIG. 7B is a diagram illustrating a state where another area in the logical address space is additionally allocated to one of the plurality of namespaces used in the memory system according to the embodiment.
FIG. 7C is a diagram illustrating a state where still another area in the logical address space is additionally allocated to the one of the plurality of namespaces used in the memory system according to the embodiment.

Next, a namespace resizing process according to the embodiment will be described. FIG. 7A is a diagram illustrating a state where one area in the logical address space is allocated to each of the namespaces used in the memory system 3 of the embodiment. FIG. 7B is a diagram illustrating a state where another area in the logical address space is additionally allocated to one of the namespaces used in the memory system 3 of the embodiment. FIG. 7C is a diagram illustrating a state where still another area in the logical address space is additionally allocated to the one of the namespaces used in the memory system 3 of the embodiment.

In FIG. 7A, a case where the namespace NS #1, namespace NS #2 and namespace NS #3 have been managed is assumed. The NSAU0, NSAU1 and NSAU2 are allocated to the namespace NS #1, namespace NS #2 and namespace NS #3, respectively. In this case, in the namespace mapping table 31, the pointer P0 corresponding to the namespace NS #1 indicates the location of the NSAU0 in the first logical address space, the pointer P0 corresponding to the namespace NS #2 indicates the location of the NSAU1 in the first logical address space, and the pointer P0 corresponding to the namespace NS #3 indicates the location of the NSAU2 in the first logical address space.

Next, with reference to FIG. 7B, a process will be described, which is executed to expand the size of the namespace NS #2. First, the controller 4 selects one unused NSAU (for example, NSAU3) of the NSAUs in the first logical address space. The controller 4 additionally allocates the selected NSAU3 to the namespace NS #2. In this case, it suffices if the controller 4 only updates the namespace mapping table 31 such that the pointer P1 corresponding to the namespace NS #2 indicates the NSAU3, and the data of each namespace need not be moved. Further, it is not necessary to change the corresponding relation between the other namespaces and the NSAUs.

Next, with reference to FIG. 7C, a process will be described, which is executed to further expand the size of the namespace NS #2. The controller 4 further selects one unused NSAU (for example, NSAU4) of the NSAUs in the first logical address space. The controller 4 additionally allocates the selected NSAU4 to the namespace NS #2. In this case as well, it suffices if the controller 4 only updates the namespace mapping table 31 such that the pointer P2 corresponding to the namespace NS #2 indicates the NSAU4.

Figure 8:
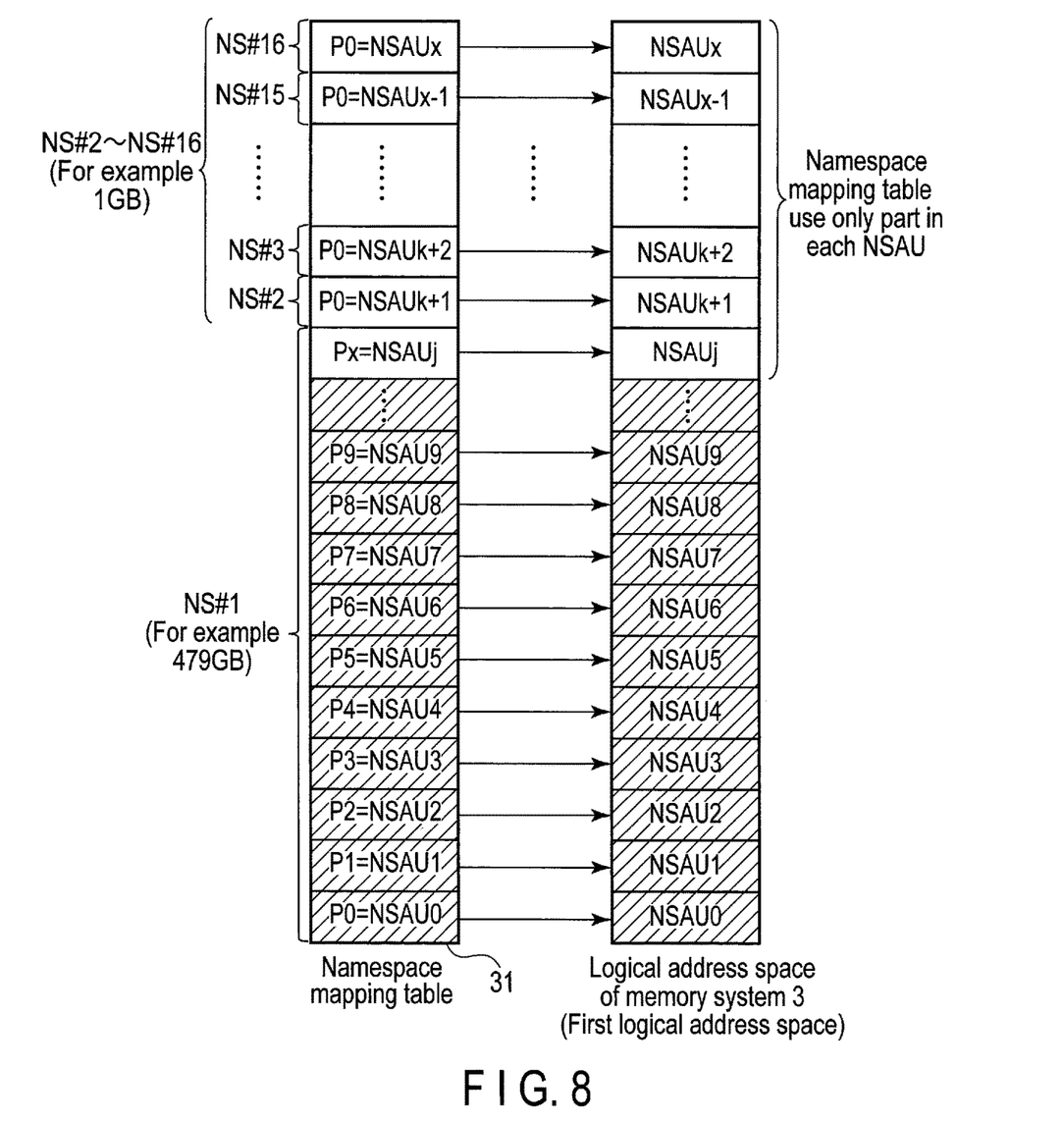
FIG. 8 is a diagram illustrating an example of a corresponding relation between a plurality of areas in a plurality of namespaces and logical address spaces used in the memory system according to the embodiment.

FIG. 8 is a diagram illustrating an example of the corresponding relation between a plurality of areas in the first logical address space and a plurality of namespaces used in the memory system 3 of the embodiment. In FIG. 8, a case where the maximum number of namespaces can be supported by the memory system 3 is sixteen and the advertised capacity of the memory system 3 is 480 GB is assumed. When the namespace NS #1 uses a size of, for example, 479 GB, the controller 4 allocates NSAUs of the number corresponding to 480 GB (that is, for example, NSAU0 to NSAUj) to the namespace NS #1. For the NSAUj, only part of the LBAs included in the NSAUj is used by the namespace NS #1. Therefore, in the NSAUj, there are unused LBAs.

However, since the NSAUj has already been allocated to the namespace NS #1, a set of unused LBAs in the NSAUj cannot be used for other namespaces.

In the memory system 3 of the embodiment, NSAUs (for example, NSAUk+1 to NSAUx) of the number corresponding to the maximum number of namespaces to be supported, exist in the remaining space of the first logical address space which excludes the second logical address space having a size equivalent to that of the advertised capacity. Therefore, even if NSAUs of the number corresponding to the advertised capacity are allocated to the namespace NS #1, one NSAU can be allocated to each of the remaining fifteen namespaces (NS #2 to NS #15).

For example, the NSAUk+1 is allocated to the namespace NS #2, and the NSAUk+2 is allocated to the namespace NS #3. Similarly, one NSAU is allocated to each of the namespaces NS #4 to NS #14, NSAUx−1 is allocated to the namespace NS #15 and NSAUx is allocated to the namespace NS #16.

The total capacity usable by the namespaces NS #2 to NS #15 is 1 GB (=480 GB−479 GB). Thus, in each of NSAUk+1 to NSAUx, only part of the LBAs included in each NSAU is used by each of the namespaces NS #2 to NS #15.

Thus, the memory system 3 of the embodiment can allocate NSAUs of the number which is equivalent to the advertised capacity to one namespace having a size slightly less than the advertised capacity, and also at the same time, can allocate one NSAU to each of the remaining namespaces, without carrying out a special process to expand the first logical address space itself. Therefore, for example, when the memory system supports sixteen namespaces, the first logical address space of the memory system 3 are equally divided into, for example, 256 NSAUs. In this manner, while enabling one namespace to use the size equivalent to the advertised capacity at maximum, a maximum of sixteen namespaces can be supported at the same time.

Further, the size of a namespace can be dynamically changed while the memory system 3 is in operation without affecting the responsiveness of the memory system 3. This is because the size of any namespace can be changed without moving the data of each namespace.

Figure 9:
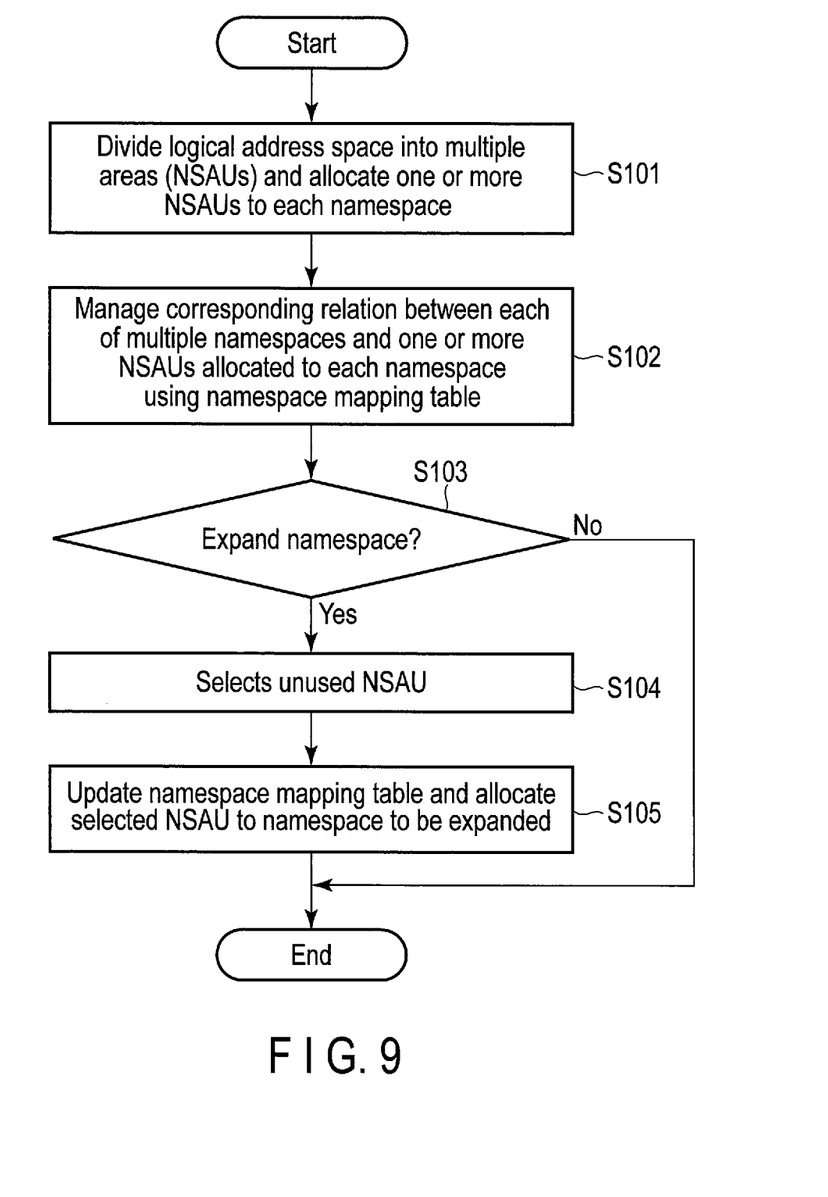
FIG. 9 is a flowchart illustrating a procedure of a namespace management process executed in the memory system according to the embodiment.

Next, a namespace managing process of the embodiment will be described. FIG. 9 is a flowchart illustrating a procedure of the namespace managing process executed in the memory system 3 of the embodiment.

The host 2 transmits one or more namespace creation requests to the memory system 3. When the memory system receives the one or more namespace creation requests (start of the namespace managing process), the controller 4 of the memory system 3 creates one or more namespace. In this case, the controller 4 divides the first logical address space of the memory system 3 into a plurality of areas (NSAUs) and allocates one or more NSAUs to each namespace (S101). In S101, the size of one NSAU is set to such a size that NSAUs of the number corresponding to the maximum number of namespaces to be supported by the memory system 3 can be allocated to the remaining space of the first logical address space, which excludes the second logical address space having a size equivalent to that of the advertised capacity. The controller 4 divides the entire first logical address space into a plurality of NSAUs each having a set size such that NSAUs of the number corresponding to the maximum number of namespaces to be supported can be allocated to the remaining space. Then, the controller 4 allocates one or more NSAUs to each namespace.

Next, the controller 4 manages the corresponding relation between each of the namespaces and one or more NSAUs allocated to each namespace using the namespace mapping table 31 (S102).

The controller 4 determines whether it is necessary to expand the size of a namespace (S103). For example, the host 2 may transmit a request (a command) to expand the size of a namespace to the memory system 3. In this case, when the controller 4 receives the request, the controller 4 may determine that it is necessary to expand the size of the namespace specified by the received request.

When it is not necessary to expand the size of a namespace (NO in S103), the controller 4 finishes the process (End).

When it is necessary to expand the size of a namespace (YES in S103), the controller 4 selects an unused NSAU from the NSAUs (S104). Here, the unused NSAU means a NSAU which has not been allocated to any namespace.

The controller 4 updates the namespace mapping table 31, thereby allocating the selected unused NSAU to the namespace to be expanded (S105). Thus, the controller 4 can dynamically expand the size of the namespace to be expanded without carrying out a process to move the data of each namespace. Then, the controller 4 finishes the process (End).

Figure 10:
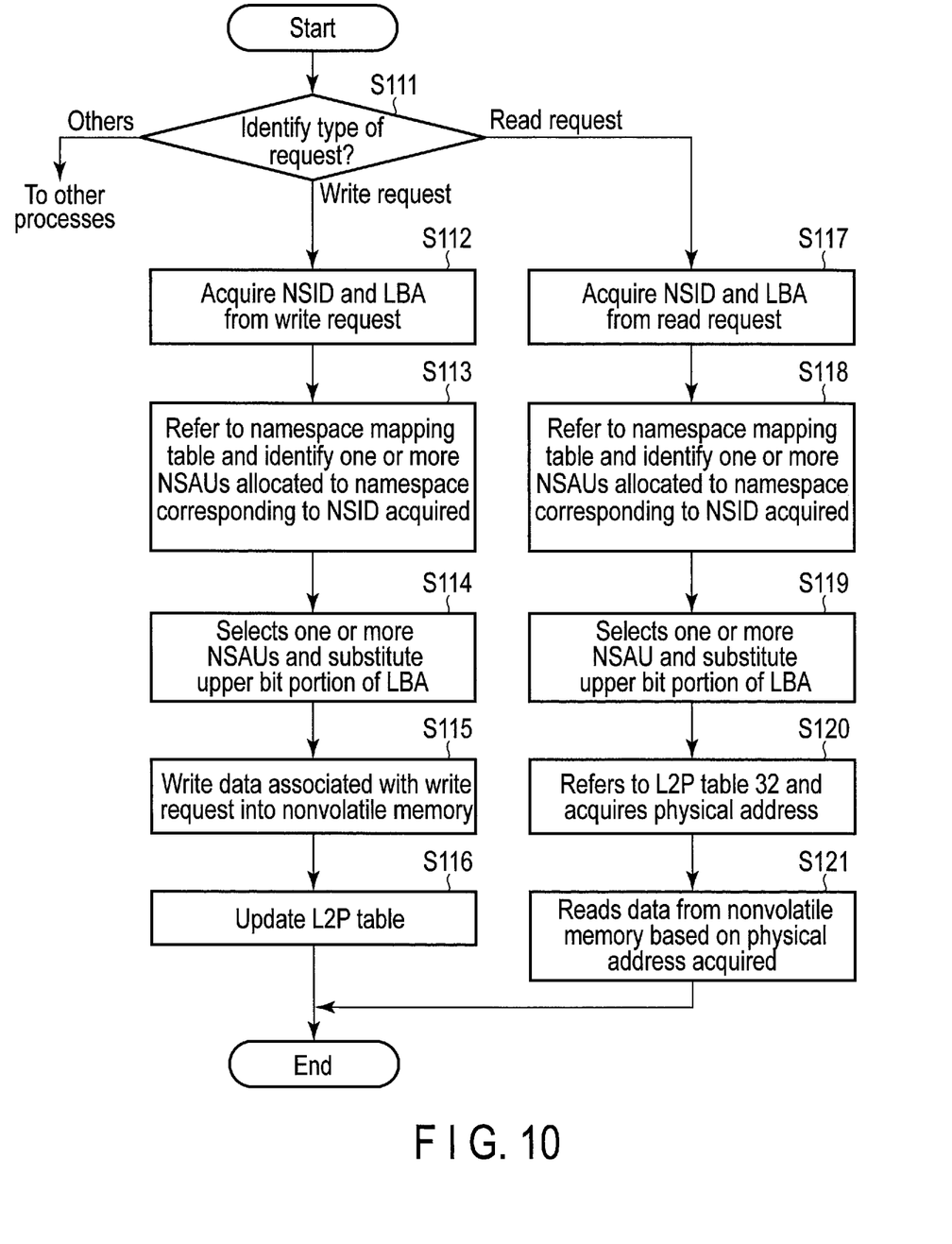
FIG. 10 is a flowchart illustrating a procedure of a write operation and a read operation which are executed in the memory system according to the embodiment.

Next, a write operation and a read operation of the embodiment will be described. FIG. 10 is a flowchart illustrating a procedure of the write operation and the read operation which are executed in the memory system 3 of the embodiment.

The host 2 transmits various requests including a write request and a read request to the memory system 3. When receiving a request (start of a process of the FIG. 10), the controller 4 determines if the received request is a write request, a read request or some other request (S111). When the received request is a write request (Write request in S111), the controller 4 acquires, from the received write request, a parameter to specify NSID and a parameter to specify an LBA within this namespace (writing designation LBA) (S112).

Next, the controller 4 identifies one or more NSAUs allocated to the namespace corresponding to the NSID specified by the acquired parameter, by referring to the namespace mapping table 31 (S113). For example, when the NSAU1 and NSAU3 are allocated to the namespace corresponding to this NSID, the controller 4 identifies the NSAU1 and NSAU3 as one or more NSAUs allocated to the namespace corresponding to this NSID. Then, the controller 4 advances to a processing of S114.

In S114, the controller 4 selects one NSAU from the identified one or more NSAUs, on the basis of an upper bit portion of the LBA (write designation LBA). Then, the controller 4 substitutes the upper bit portion of the LBA (write designation LBA) with a bit string indicating the location of the selected NSAU in the first logical address space, and thus converts the LBA (write designation LBA) into an access target logical address which belongs to the selected NSAU in the first logical address space.

After converting the LBA (write designation LBA) into the access target logical address, the controller 4 writes data (write data) associated with the received write request into the nonvolatile memory 5 (S115). Then, the controller 4 updates the L2P table 32 such that the physical address indicating a storage location (physical storage location) in the nonvolatile memory 5, where the write data is written, is associated with the access target logical address (S116). Then, the controller 4 finishes the process (End).

When the received request is a read request (Read Request in S111), the controller 4 acquires, from the received read request, a parameter to specify NSID and a parameter to specify LBA (Read target LBA) in the namespace (S117).

Then, the controller 4 identifies one or more NSAUs allocated to the namespace corresponding to the NSID specified by the acquired parameter, by referring to the namespace mapping table 31 (S118). For example, when the NSAU1 and NSAU3 are allocated to the namespace corresponding to the NSID, the controller 4 identifies NSAU1 and NSAU3 as one or more NSAUs allocated to the namespace corresponding to the NSID. Then, the controller 4 advances to a processing of S119.

In S119, the controller 4 selects one NSAU from the identified one or more NSAUs, on the basis of an upper bit portion of the LBA (read target LBA). Then, the controller 4 substitutes the upper bit portion of the LBA (read target LBA) with a bit string indicating the location of the selected NSAU in the first logical address space, and thus converts the LBA (read target LBA) into an access target logical address which belongs to the selected NSAU in the first logical address space.

After converting the LBA (read target LBA) into the access target logical address, the controller 4 identifies a physical address where the data corresponding to the access target logical address is stored, by referring to the L2P table 32 (S120). In S120, the controller 4 acquires a physical address stored in an entry in the L2P table 32, which corresponds to the access target logical address, from the L2P table 32 as the physical address where the data corresponding to the access target logical address is stored.

The controller 4 reads the read target data from the nonvolatile memory 5 on the basis of the identified physical address, and transmits, to the host 2, the read target data which is read from the nonvolatile memory 5 (S121). Then, the controller 4 finishes the process (End).

Next, an example of the address conversion operation executed in S114 will be described. Let us suppose a case, for example, the first logical address space is divided into 256 NSAUs (NSAU0 to NSAU255) and NSAU1 and NSAU3 are allocated to the namespace corresponding to NSID specified by the write request received.

In this case, when the upper 8-bit portion of the LBA (write designation LBA) is "00000000", the controller 4 selects NSAU1 and substitutes the upper 8-bit portion "00000000" with a bit string "00000001" indicating the location of the NSAU1 in the first logical address space. The access target logical address is expressed by the substituted bit string "00000001" and a lower 24-bit portion of the LBA (write designation LBA).

When the upper 8-bit portion is "00000001", the controller 4 selects NSAU3 and substitutes the upper 8-bit portion "00000001" with the bit string "00000011" indicating the location of the NSAU3 in the first logical address space. The access target logical address is expressed by the substituted bit string "00000011" and the lower 24-bit portion of the LBA (write designation LBA).

In S119 as well, an address conversion operation similar to the address conversion operation carried out in S114 is executed.

As discussed above, according to the embodiment, the controller 4 allocates one or more NSAUs of a plurality of NSAUs to each of a plurality of namespaces used by the host 2. The plurality of NSAUs are obtained by equally dividing the first logical address space of the memory system 3 managed by the controller 4. Here, each of the NSAUs has such a size that areas (NSAUs) of the number corresponding to the maximum number of namespaces to be supported can be allocated to the remaining space excluding the second logical address space having a size equivalent to a size of the advertised capacity of the memory system 3, from the first logical address space. Thus, the first logical address space is divided in a plurality of NSAUs such that NSAUs of the number corresponding to the maximum number of the namespaces to be supported are allocated to the remaining space. The controller 4 manages the corresponding relation between each of the namespaces and one or more NSAUs allocated to each of the namespaces using the namespace mapping table 31. Then, when the size of the first namespace of the namespaces is to be expanded, the controller 4 updates the namespace mapping table 31 and additionally allocates an unused NSAU of the NSAUs to the first namespace.

In this case, it suffices if the controller 4 only updates the namespace mapping table 31, and it is not necessary to move the data of each namespace. Further, it is not necessary to change the corresponding relation between each of the other namespaces and one or more NSAUs. Thus, the controller 4 can dynamically expand the size of the first namespace without carrying out a process of moving the data of each namespace.

Further, for one namespace having a size slightly less than that of the advertised capacity, NSAUs of the number equivalent to that of the advertised capacity can be allocated and also at the same time, one NSAU can be allocated to each of the remaining namespaces, without carrying out a particular process for expanding the first logical address space itself. Therefore, while enabling one namespace to use the size equivalent to that of the advertised capacity at the maximum, and at the same time, the maximum number of namespaces can be supported.

Note the embodiment is directed to a case where a NAND flash memory is a nonvolatile memory. But, the function of the embodiment is also applicable to other various nonvolatile memories, for example, magnetoresistive random access memories (MRAM), phase-change random access memories (PRAM), resistive random access memories (ReRAMs) and ferroelectric random access memories (FeRAMs).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory; and
a controller configured to control the nonvolatile memory, wherein
the controller is configured to:
allocate one or more areas of a plurality of areas to each of a plurality of namespaces used by the host to access the memory system, the plurality of areas being obtained by equally dividing a first logical address space of the memory system managed by the controller, each of the plurality of areas having such a size that areas corresponding in number to a maximum number of namespaces to be supported are allocable to a remaining space excluding a second logical address space from the first logical address space, the second logical address space having a size equivalent to a size of an advertised capacity of the memory system;
manage a corresponding relation between each of the plurality of namespaces and the one or more areas allocated to each of the plurality of namespaces, using a first management table; and
update, when a size of a first namespace of the plurality of namespaces is to be expanded, the first management table to additionally allocate an unused area of the plurality of areas to the first namespace without reallocating a used area of the plurality of areas.

2. The memory system of claim 1, wherein
the controller manages the first logical address space by binary numbers, and
the advertised capacity of the memory system is expressed by decimal numbers and is less than a capacity capable of being expressed by the first logical address space.

3. The memory system of claim 1, wherein
the controller is configured to:
in response to receiving from the host a read/write request that specifies a first namespace identifier and a first logical address, identify one or more areas allocated to one namespace designated by the first namespace identifier by referring to the first management table;
select one area from the identified one or more areas, on the basis of a value of an upper bit portion of the first logical address; and
convert the first logical address into an access target logical address which belongs to the selected area in the first logical address space, by substituting the upper bit portion of the first logical address with a first bit string indicating a location of the selected area in the first logical address space.

4. The memory system of claim 1, wherein
the controller is configured to update the first management table and additionally allocate the unused area to the first namespace in response to receiving from the host a request to expand the size of the first namespace.

5. The memory system of claim 1, wherein
the controller is configured to, when the size of the first namespace of the plurality of namespaces is to be expanded, update the first management table and additionally allocate the unused area to the first namespace without executing a process to move data of each namespace.

6. A method of controlling a memory system comprising a nonvolatile memory and a controller configured to control the nonvolatile memory, the method comprising:
allocating one or more areas of a plurality of areas to each of a plurality of namespaces used by a host to access the memory system, the plurality of areas being obtained by equally dividing a first logical address space of the memory system managed by the controller, each of the plurality of areas having such a size that areas corresponding in number to a maximum number of namespaces to be supported are allocable to a remaining space excluding a second logical address space from the first logical address space, the second logical address space having a size equivalent to a size of an advertised capacity of the memory system;
managing a corresponding relation between each of the plurality of namespaces and the one or more areas allocated to each of the plurality of namespaces, using a first management table; and
updating, when a size of a first namespace of the plurality of namespaces is to be expanded, the first management table to additionally allocating an unused area of the plurality of areas to the first namespace without reallocating a used area of the plurality of areas.

7. The method of claim 6, wherein
the first logical address space is managed by the controller by binary numbers, and
the advertised capacity of the memory system is expressed by decimal numbers and is less than a capacity capable of being expressed by the first logical address space.

8. The method of claim 6, further comprising:

in response to receiving from the host a read/write request that specifies a first namespace identifier and a first logical address, identifying one or more areas allocated to one namespace designated by the first namespace identifier by referring to the first management table;

selecting one area from the identified one or more areas, on the basis of a value of an upper bit portion of the first logical address; and converting the first logical address into an access target logical address which belongs to the selected area in the first logical address space, by substituting the upper bit portion of the first logical address with a first bit string indicating a location of the selected area in the first logical address space.

9. The method of claim 6, wherein the additionally allocating includes updating the first management table and additionally allocating the unused area to the first namespace in response to receiving from the host a request to expand the size of the first namespace.

10. The method of claim 6, wherein the additionally allocating includes updating the first management table and additionally allocating the unused area to the first namespace without executing a process to move data of each namespace.

* * * * *